United States Patent Office 2,831,847
Patented Apr. 22, 1958

2,831,847

HYDROXYALKYLATED FATTY ACID CHLORIDE-PEPTIDE CONDENSATION PRODUCT AND PROCESS

Hans-Dieter Selle, Berlin, Germany, assignor to VEB Chemische Fabrik Grünau, Berlin-Grunau, Germany No Drawing. Application January 23, 1956
Serial No. 560,877

11 Claims. (Cl. 260—112)

This is a continuation-in-part application of my U. S. patent application, Serial No. 403,925, filed on January 13, 1954, for "Procedure for the Production of Active Washing Substances," now abandoned.

My invention relates to novel chemical compounds useful as detergents and to a method for preparing same.

It is an object of this invention to provide novel chemical compounds having a strong washing effect.

A further object of the invention is the provision of a method for the production of compounds having a strong washing effect.

Still a further object of this invention is generally to improve on detergents and methods for their preparation as now customarily used and carried out, respectively.

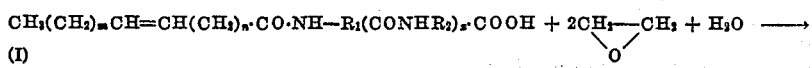
(I)

Other objects of this invention will be apparent from the following description.

The starting material used for carrying out the inventive method is obtained from condensation products of a radical of a peptide of naturally occurring amino acids formed by hydrolysis of protein, such as, for example, albumin, and the acyl of higher fatty acids.

Such condensation products comprising a peptide radical and an acyl of higher fatty acid component are generally obtained in the form of their alkali salts. When these alkali condensates are treated with, for example, mineral acids, compounds are obtained which hereinafter will be referred to as "free fatty albuminous acids" since they contain a free carboxyl group in the split protein or albuminous component, i. e. in the peptide moiety.

For the proper understanding of this invention, it is important properly to distinguish between the alkali condensates refered to, which usually contain all kinds of undesired impurities, and the free acids obtained therefrom as hereinbefore described. The free fatty albuminous acids react differently than the condensates and constitute thus different compounds. The condensates, moreover, exhibit a poor washing effect as compared with commonly used detergents. The reason for this poor washing effect may be found in the disadvantageous relation between the hydrophobic and hydrophile components in the molecules of the condensates. This invention is only concerned with the free fatty albuminous acids and not with the condensates.

The starting material for the inventive method is constituted by such high molecular free fatty albuminous acids in which the fatty acid component is unsaturated and thus includes a double bond. The general structure of the starting material can be represented by the following general formula $$CH_3(CH_2)_m CH=CH(CH_2)_n \cdot CO \cdot NH-R_1(CONHR_2)_x \cdot COOH$$

wherein $m+n$ is any number between 10 and 20, $x$ is any integar between 2 and 10 inclusive, NHR, $(CONHR_2)_x$ is the radical of a peptide of naturally occurring amino acids formed by the hydrolysis of protein, and $R_1$ and $R_2$ are low molecular hydrocarbon radicals, for example —$CH_3$ groups emanating from the albumin or split protein source.

As can be seen from this formula, the fatty acid component includes a double bond, while the peptide moiety includes a free carboxyl group.

It has now been found that if such unsaturated free fatty albuminous acids are reacted with ethylene oxide or compounds forming or splitting off ethylene oxide, novel compounds are obtained which have a considerable washing effect, while at the same time retaining the excellent surface-active properties of the condensates. In fact, the washing effect of these novel compounds is by far superior to that of the commonly used detergents, as for example alkyl sulfonates.

The reaction between the unsaturated fatty albuminous acid and the ethylene oxide proceeds substantially in accordance with the following formula:

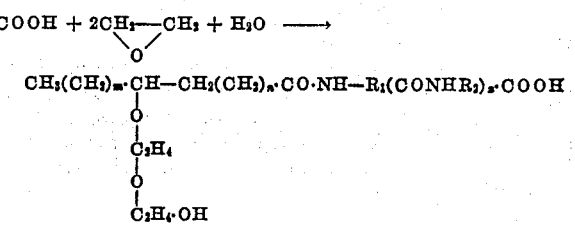

wherein $m+n$, $x$ and $R_1$ and $R_2$ have the above described meaning.

From above formula it can be readily seen that the ethylene oxide reacts at the double bond of the fatty acid component, so that a glycol ether radical becomes attached to the fatty acid component. Contrary to expectations, the free carboxyl group of the peptide moiety does not react. This course of reaction may explain the good washing activity of the final compound, since the hydrophobic component of the molecule is reinforced.

The reaction is preferably carried out within a pH range of 4–5.

It is again emphasized that the glycol ether chain attaches itself to the double bond of the fatty acid component and not the free carboxyl group of the peptide moiety. Known reactions with the condensates—and not the free acids—have shown that the reactive group is usually in the spilt protein or peptide part which therefore reacts first. The course of the instant reaction is thus entirely unexpected. The fact that the carboxyl group in the peptide albuminous part is preserved can be shown analytically and is also evidenced by the fact that the novel products are not stable in acids. The amount of ethylene oxide required is relatively small (2–3 mol of ethylene oxide to 1 mol of free fatty albuminous acid).

With a view to facilitating the course of the reaction, it is advantageous to block the reactive groups in the peptide component of the unsaturated free fatty albuminous acid prior to the reaction with the ethylene oxide. If this is done, the ethylene oxide attacks the double bond in the fatty acid component more readily and completely. Such blocking may be effected by treating the starting material with, for example, the anhydrides of low molecular organic acids, e. g. acetic anhydride. After such blocking (considerably less ethylene oxide is consumed in the reaction with the unsaturated free fatty albuminous acid.

As already pointed out, it is within the scope of this invention to effect the reaction not only with ethylene oxide proper, but also with compounds yielding or splitting off ethylene oxide. Such compound is, for example, ethylene chlorohydrin. If the novel compounds according to this invention are to be prepared with ethylene chlorohydrin, the unsaturated free fatty albuminous acid—after blocking the reactive groups of the peptide moiety—is treated with ethylene chlorohydrin for several hours at elevated temperature in a reaction vessel fitted with a reflux condenser. The product thus obtained has a considerable washing activity and corresponds to the general formula given above.

The invention will now be described by several examples, but it should be understood that these examples are given by way of illustration rather than by way of limitation and that many changes may be effected in, for example, the quantities and treating conditions in general without in any way departing from the spirit of this invention.

*Example 1*

25 grams of ethylene oxide are added to and stirred with 100 grams of a water-containing free fatty albuminous acid as hereinbefore defined and illustrated by formula i. e. a compound comprised of an unsaturated fatty acid component and a peptide radical of naturally occuring amino acids formed by hydrolysis of protein, which peptide radical comprises a free carboxyl group. The unsaturated fatty acid component is constituted by oleic acid acyl. The acid contains about 60% of dry substance. The reaction is carried out in a pressure flask and the reaction mixture is kept in the flask for about 6 hours at a temperature of 50–55° C. The reaction product has the following formula

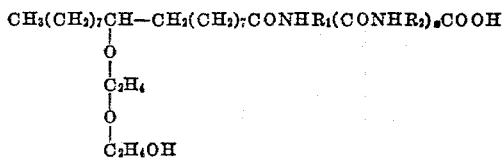

It is thereafter neutralized with NaOH.

The product thus obtained is of oily consistence and is readily soluble in water under formation of large amounts of lather. Analysis shows that the product corresponds to the general Formula I given above. It has excellent surface-active properties and possesses a strong washing activity.

*Example 2*

The following reaction is carried out in an enameled reaction vessel, capable of being closed and having a stirring attachment. 600 kilograms of water-containing free fatty albuminous acid are fed into the reaction vessel. The dry content of the acid is about 60%. While stirring, 30 kilograms of acetic anhydride are added to the acid at a temperature of about 45° C. The reaction mixture is then stirred for a further 60–90 minutes, whereafter the pH value of the mixture is adjusted to about 4–5 by adding a sodium hydroxide solution. The reaction vessel is thereafter closed. 50 kilograms of ethylene oxide are now introduced under stirring at a temperature of about 50–55° C. The reaction is completed after about 5 hours of continuous stirring at the last mentioned temperature. The reaction vessel is then opened and the reaction product is neutralized with sodium hydroxide, whereafter the product is ready for use.

The product thus obtained corresponds to general Formula I. It has the same surface-active properties and excellent washing activity as the compound obtained in Example 1.

*Example 3*

5 grams of acetic anhydride are added to 100 grams of free fatty albuminous acid having a dry content of about 60%. The mixture is stirred for 60 to 90 minutes at a temperature of about 45° C. The pH value of the mixture is then adjusted to about 4–5 by adding a sodium hydroxide solution. Thereafter, 25 grams of ethylene chlorohydrin are added. The reaction mixture is then heated under reflux for about 3–5 hours at a temperature of about 120–130° C. The reaction product thus obtained is neutralized with sodium hydroxide. It corresponds to the Formula I and has excellent surface-active properties and a considerable washing effect.

What I claim is:

1. As a novel composition of matter useful as a detergent, the reaction product of a mineral acid treated unsaturated higher fatty acid chloride-peptide condensation product and a compound selected from the group consisting of ethylene oxide and ethylene chlorohydrin, wherein said peptide comprises a partial hydrolysis product of protein, wherein said condensation product contains free carboxy group, and wherein said mineral acid treated unsaturated higher fatty acid chloride-peptide condensation product and said compound are reacted in the ratio of about 1 mole of the former to about 2 to 3 moles of the latter.

2. A composition according to claim 1 wherein said condensation product is treated with acetic anhydride prior to its reaction with said compound.

3. A composition according to claim 1, wherein said peptide is a partial hydrolysis product of albumin.

4. A composition according to claim 2, wherein said peptide is a partial hydrolysis product of albumin.

5. A process for the preparation of a composition of matter useful as a detergent, which comprises reacting a mineral acid treated unsaturated higher fatty acid chloride-peptide condensation product with a compound selected from the group consisting of ethylene oxide and ethylene chlorohydrin and recovering the reaction product, wherein said peptide comprises a partial hydrolysis product of a protein and wherein said condensation product contains free carboxy group.

6. A process according to claim 5 wherein the reaction is carried out at a pH within the range of 4–5.

7. A process according to claim 5 wherein said condensation product is reacted with acetic anhydride prior to its reaction with said compound.

8. A process according to claim 5 wherein said peptide is a partial hydrolysis product of albumin.

9. A process according to claim 5 wherein said condensation product and said compound are reacted in the ratio of about 1 mole of the former to about 2 to 3 moles of the latter.

10. A process for the preparation of a composition of matter useful as a detergent which comprises reacting a mineral acid treated unsaturated higher fatty acid-peptide condensation product with ethylene oxide under pressure and at a temperature within the range of 50–55° C., and recovering the reaction product, said peptide comprising a partial hydrolysis product of albumin, and said condensation product containing free carboxy group.

11. A process for the preparation of a composition of matter useful as detergent which comprises reacting a mineral acid treated unsaturated higher fatty acid-peptide condensation product with acetic anhydride at a temperature of about 45° C., to block the reactive groups in the peptide component of said condensation product, adjusting the pH of the reaction mixture to about 4-5, and then reacting this product with ethylene oxide at a temperature of about 50-55° C., said peptide comprising a partial hydrolysis product of albumin, and said condensation product containing free carboxy group.

References Cited in the file of this patent

FOREIGN PATENTS

| | | |
|---|---|---|
| 1,085,229 | France | Jan. 28, 1955 |
| 728,224 | Germany | Nov. 23, 1942 |
| 750,401 | Germany | Jan. 16, 1945 |